(12) United States Patent
DeCusatis et al.

(10) Patent No.: US 8,381,275 B2
(45) Date of Patent: Feb. 19, 2013

(54) STAGED USER DELETION

(75) Inventors: Casimer M. DeCusatis, Poughkeepsie, NY (US); Rajaram B. Krishnamurthy, Poughkeepsie, NY (US); Brian J. Neugebauer, Poughkeepsie, NY (US); Michael Onghena, Poughkeepsie, NY (US); Anuradha Rao, Poughkeepsie, NY (US); Naseer S. Siddique, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 12/694,671

(22) Filed: Jan. 27, 2010

(65) Prior Publication Data

US 2011/0185404 A1 Jul. 28, 2011

(51) Int. Cl.
*G06F 21/00* (2006.01)
(52) U.S. Cl. .................. 726/6; 726/2; 726/3; 726/5
(58) Field of Classification Search .................. 726/6
See application file for complete search history.

(56) References Cited

U.S. PATENT DOCUMENTS

| 5,761,655 | A * | 6/1998 | Hoffman ........................ 1/1 |
| 6,459,457 | B1 | 10/2002 | Renner et al. |
| 7,340,487 | B2 | 3/2008 | Chang et al. |
| 7,392,535 | B2 | 6/2008 | Horikiri |
| 7,464,400 | B2 | 12/2008 | Jindani et al. |
| 7,607,027 | B2 | 10/2009 | Williams et al. |
| 2005/0071643 | A1* | 3/2005 | Moghe ........................ 713/182 |
| 2006/0015416 | A1* | 1/2006 | Hoffman et al. ............... 705/28 |
| 2007/0073699 | A1* | 3/2007 | Reed ............................... 707/9 |
| 2007/0198662 | A1* | 8/2007 | Parham et al. ............... 709/219 |
| 2010/0083268 | A1* | 4/2010 | Morris ........................ 718/104 |

OTHER PUBLICATIONS

Tivoli zSecure Admin: Access monitoring and RACF database cleanup, retrieved from: http://publib.boulder.ibm.com/infocenter/tivihelp/v2r1/topic/com.ibm.zsecure.doc/r . . . retrieved on Jan. 26, 2010, 1 page.
Performing RACF database cleanup tasks, Chapter 10, RACF Access Monitor, Admin and Audit for RACF, Version 1.11.0: User Reference Manual, pp. 10-25 thru 10-37.
Lotus Domino Administrator 7 Help—Delete person in Domino Directory, retrieved from: http://extranet2.ahrq.gov/help/help7_admin.nsf/f4b82fb75e942a6852566ac0037f2 . . . retrieved on Jan. 26, 2010, 6 pages.

* cited by examiner

*Primary Examiner* — William Goodchild
(74) *Attorney, Agent, or Firm* — Cantor Colburn LLP; William A. Kinnaman, Jr.

(57) ABSTRACT

A method, system, and computer program product for staged user identifier deletion are provided. The method includes checking a status of a user identifier in response to a triggering event. In response to determining that the status of the user identifier indicates a marked for deletion status, a notification action is performed. The method also includes monitoring a time value to determine whether a time for deletion associated with the user identifier with the marked for deletion status has been reached, and automatically deleting the user identifier with the marked for deletion status in response to determining that the time for deletion has been reached.

17 Claims, 5 Drawing Sheets

| 202 | 204 | 206 | 208 | 209 | 210 |
|---|---|---|---|---|---|
| USER ID | PASSWORD | STATUS | TIME UNTIL DELETION | LAST ACCESS | NOTIFICATION ACTION |
| USER1 202a | ABC123 204a | ACTIVE 206a | NULL 208a | NULL 209a | NULL 210a |
| USER2 202b | A3H4JR39 204b | MARKED FOR DELETION 206b | 30 DAYS 208b | DEC 15, 2009 208b | EMAIL ADMIN1 AND LOG 210b |
| USER3 202c | ZN78YH92H 204c | MARKED FOR DELETION 206c | 12 DAYS 208c | JAN 4, 2010 208c | IM ADMIN2 AND LOG 210c |
| USER4 202d | QWERTY1 204d | ACTIVE 206d | NULL 208d | NULL 208d | NULL 210d |
| USERn 202n | PXK907LKM 204n | MARKED FOR DELETION 206n | 13 MONTHS 208n | NOV 18, 2009 208n | LOG ONLY 210n |

STAGED USER DELETION

BACKGROUND

The present invention relates generally to computer security, and more specifically, to providing staged user identifier deletion.

Secure computer systems typically employ user identifiers (IDs) to control user access to resources. Given a large organization running security systems with many thousands of users, sometimes mistakes are made where a user ID is deleted which should not have been deleted. This can be especially serious when deleted user IDs are associated with system tasks that run automatically. Over time, administrators may not remember which user IDs are associated with these tasks. If a user ID associated with a task is deleted, the task may no longer work, resulting in an error condition. It can take time to understand why the task has failed, and then even more time to re-establish the user ID for the task.

The deletion of the user ID can have side effects on other information associated with the deleted user ID. Digital certificates and encryption keys are examples of information that can be associated with particular user IDs. If the deleted user ID cannot be restored from backup data, the results can be devastating and possibly unrecoverable. If the backup data contains other deleted user IDs, there is also a risk of restoring deleted user IDs that should still be deleted, making the restoration process more cumbersome.

SUMMARY

An exemplary embodiment is a method for staged user identifier deletion. The method includes checking a status of a user identifier in response to a triggering event. In response to determining that the status of the user identifier indicates a marked for deletion status, a notification action is performed. The method also includes monitoring a time value to determine whether a time for deletion associated with the user identifier with the marked for deletion status has been reached, and automatically deleting the user identifier with the marked for deletion status in response to determining that the time for deletion has been reached.

Another exemplary embodiment is a system for staged user identifier deletion. The system includes a security database with a plurality of user identifiers, and status and time stamp fields associated with the plurality of user identifiers. The system also includes a security manager in communication with the security database. The security manager is configured to check a status of a user identifier from the plurality of user identifiers and status fields in response to a triggering event. In response to determining that the status of the user identifier indicates a marked for deletion status has been reached, a notification action is performed. The system is also configured to monitor a time value to determine whether a time for deletion associated with the user identifier with the marked for deletion status has been reached, and automatically delete the user identifier with the marked for deletion status from the security database in response to determining that the time for deletion has been reached.

A further exemplary embodiment is a computer program product for staged user identifier deletion. The computer program product includes a computer readable storage medium readable by a processing circuit and storing instructions for execution by the processing circuit for implementing a method. The method includes checking a status of a user identifier in response to a triggering event. In response to determining that the status of the user identifier indicates a marked for deletion status has been reached, a notification action is performed. The method further includes monitoring a time value to determine whether a time for deletion associated with the user identifier with the marked for deletion status has been reached, and automatically deleting the user identifier with the marked for deletion status in response to determining that the time for deletion has been reached.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Exemplary embodiments of the present invention provide staged user identifier (ID) deletion. Rather than immediately deleting a user ID when deletion is desired, the user ID is marked for future deletion by an administrative action. Marking the user ID for future deletion indicates that the marked user ID is no longer needed, but otherwise the marked user ID remains intact for a period of time until deletion. The period of time until deletion may be configured on a user-by-user basis, a group basis, or an organization basis. Any access to the marked user ID can trigger a notification action, including logging information about the event and/or sending a message to an administrator. Accessing the marked user ID also resets the values used to determine a time for deletion. When the time for deletion is reached, deletion of the user ID is automatically completed without further administrative action. Prior to final deletion of the marked user ID, the user ID can be switched back to active status by administrative action.

Figure 1:
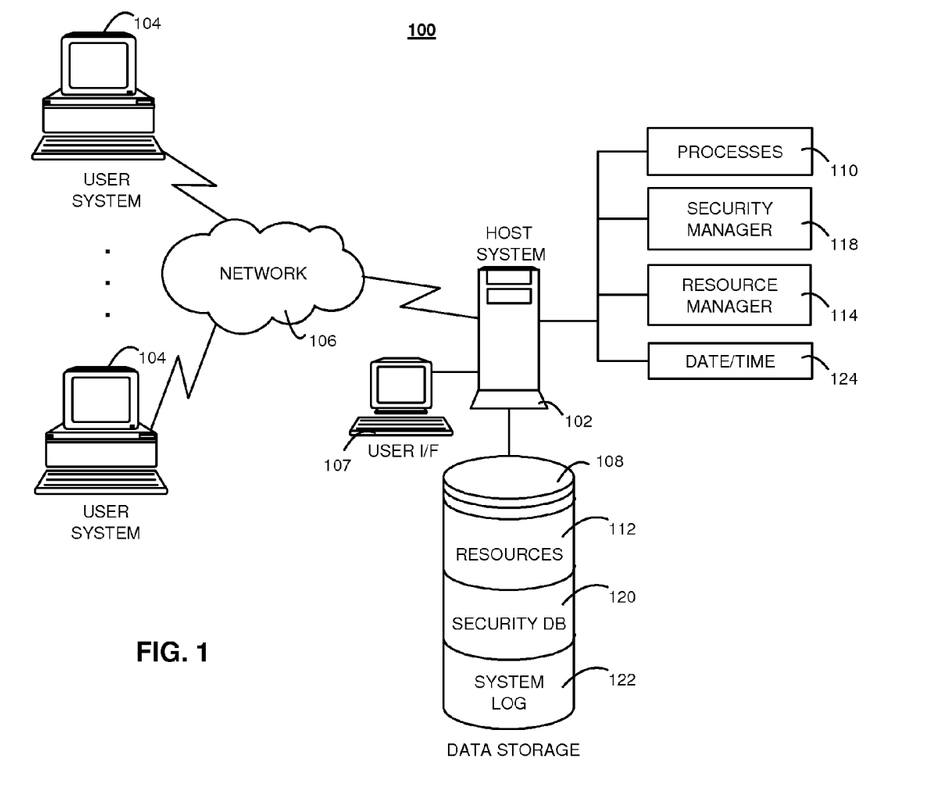
FIG. 1 depicts an example of a system for staged user identifier deletion in accordance with exemplary embodiments.

Turning now to the drawings, it will be seen that in FIG. 1 there is a block diagram of a system 100 upon which staged user ID deletion is implemented in exemplary embodiments. The system 100 of FIG. 1 includes host system 102 in communication with user systems 104 over a network 106. In exemplary embodiments, the host system 102 is a high-speed processing device (e.g., a mainframe computer, a desktop computer, a laptop computer, a hand-held device, an embedded computing device, or the like) including at least one processing circuit (e.g., a CPU) capable of reading and executing instructions, and handling numerous interaction requests from the user systems 104.

In exemplary embodiments, the user systems 104 comprise desktop, laptop, general-purpose computer devices, and/or networked devices with processing circuits and I/O interfaces, such as a keyboard and display device. The host system 102 and user systems 104 can include various computer hardware and software technology known in the art, such as one or more processing units or circuits, volatile and non-volatile memory including removable media, power supplies, network interfaces, support circuitry, operating systems, and the like. The host system 102 may also include one or more user interfaces 107 with user accessible I/O devices, such as a keyboard, mouse, and display. The one or more user interfaces 107 enable one or more local users to access the host system 102 without communicating over the network 106. For example, the network 106 and user systems 104 can be omitted, where user interaction is performed through the one or more user interfaces 107.

The network 106 may be any type of communications network known in the art. For example, the network 106 may be an intranet, extranet, or an internetwork, such as the Internet, or a combination thereof. The network 106 can include wireless, wired, and/or fiber optic links. Additional computer systems (not depicted) may also access the host system 102 via the network 106 or other networks.

The data storage system 108 refers to any type of computer readable storage media and may comprise one or more secondary storage elements, e.g., hard disk drive (HDD), tape, or a storage subsystem that is internal or external to the host system 102. Types of data that may be stored in the data storage system 108 include, for example, various files and databases subject to security constraints. It will be understood that the data storage system 108 shown in FIG. 1 is provided for purposes of simplification and ease of explanation and is not to be construed as limiting in scope. To the contrary, there may be multiple data storage systems 108 utilized by the host system 102, which can be distributed in various locations of the system 100.

Processes 110 associated with one or more user IDs may be initiated periodically or in response to user requests from the user systems 104 and/or the one or more user interfaces 107. The processes 110 can execute on host system 102, on the user systems 104, or on one or more remote systems (not depicted). For example, the processes 110 may include batch processes that perform certain actions for particular user IDs or groups of user IDs. The processes 110 may attempt to access resources 112, which can be associated with one or more users IDs. In the example of FIG. 1, the resources 112 are data items in the data storage system 108. The resources 112 can be digital certificates, encryption keys, database records, and other files associated with user IDs. A resource manager 114 controls the resources 112. The resource manager 114 may query the security manager 118 to determine if a user ID is permitted access to a resource 112. The security manager 118 may access the security database 120 in order to determine specific user IDs and authorization requirements associated with requests for the resources 112. The security manager 118 returns an answer to the resource manager 114. The resource manager 114 will either access the resources 112 on behalf of the user or not access the resources 112 based on the answer from the security manager 118.

The resource manager 114 authorizes a user ID by passing an authorization request to security manager 118. The security manager 118 accesses security database 120 to check the user ID and the resources 112 which are to be accessed by the user ID. A user ID marked for deletion is treated differently than a standard, active user ID. In response to retrieving the marked user ID from the security database 120, a notification action is performed. The notification action can record an associated event in system log 122. A notification action may also send a message to a system administrator indicating an interaction with the marked user ID. The message can be in any format, such as an e-mail message, instant message, or a pop-up warning message. Similarly, any reference to the marked user ID can also result in a notification message and/or event record in the system log 122. For example, the resource manager 114 may determine that one of the accessed resources 112 does not require user authorization, but the resource manager 114 can still send a notification of the requested access to security manager 118 to check whether an associated user ID has a marked for deletion status. When one of the processes 110 is executed under the authority of a marked user ID, the notification action can also be triggered.

In exemplary embodiments, a date/time function 124 is used to determine the present date and/or time. The date/time function 124 provides a reference point to determine whether a time for deletion associated with a user ID with a marked for deletion status has been reached. Each user ID with a marked for deletion status may have one or more time-based parameters that are reset or adjusted in response to receiving a triggering event to check the status of the user ID. The resetting or adjusting of the one or more time-based parameters extends the amount of time until the user ID is automatically deleted.

Figure 2:
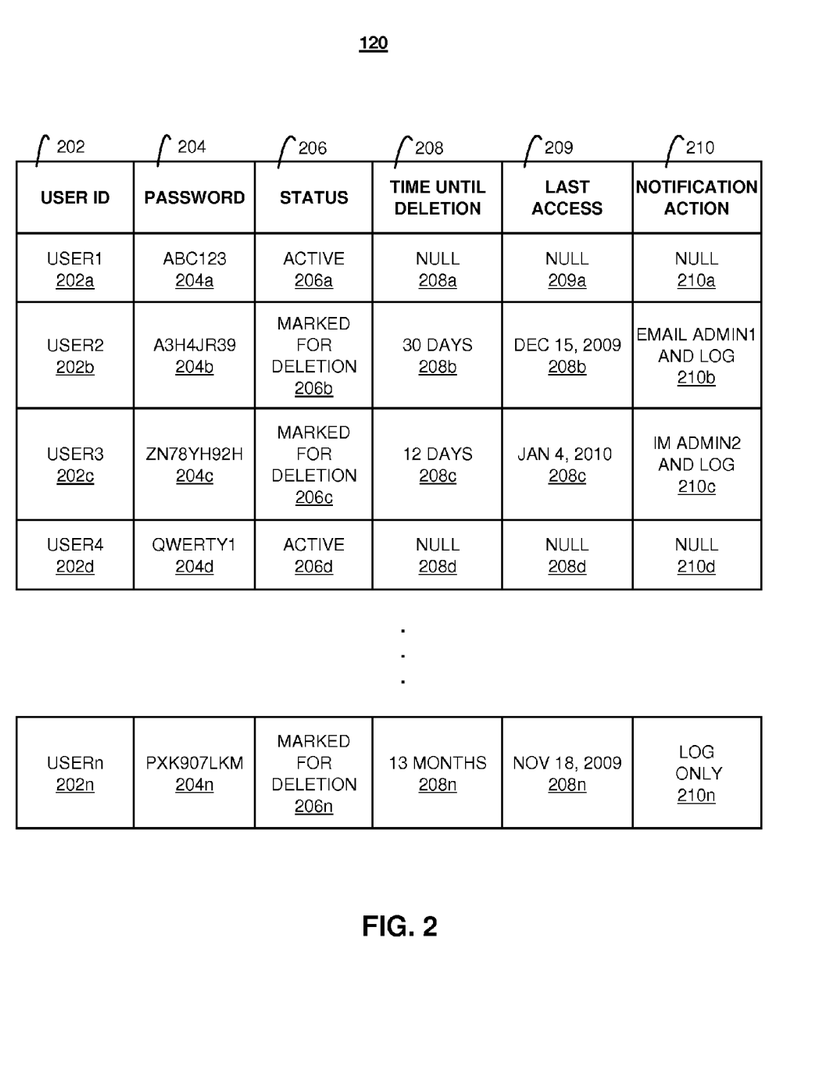
FIG. 2 depicts an example of a security database in accordance with exemplary embodiments.

FIG. 2 depicts an example of types of information stored in the security database 120 of FIG. 1. For example, the security database 120 can include multiple user IDs 202a-n with associated passwords 204a-n, status fields 206a-n, time until deletion fields 208a-n, last access fields 209a-n, notification action fields 210a-n, and/or other fields. When a user ID, such as user1 202a has a value of "active" in an associated status field 206a, values in associated time until deletion, last access, and notifications action fields 208a, 209a and 210a are "don't care" values since fields 208a, 209a and 210a need not be read for active users. In this example, the values of fields 208a, 209a and 210a are set to null states.

An administrative action from a command-line interface, graphical user interface, or another program may set and update the status fields 206a-n. Marking a user ID for deletion can be as simple as setting a bit in an associated status field. For example, when user2 202b is no longer needed, status field 206b is set to "marked for deletion" status. In one embodiment, the time until deletion field 208b is set to an amount of time from the last access for automatic deletion, where the last access time is stored in last access field 209b. In this embodiment, upon an access, the last access field 209b is set to the present date. In the example of FIG. 2, field 208b is set to 30 days; however, the time until deletion fields 208a-n can be expressed in any date/time format, including absolute or relative date/times. The time and/or date can be tracked using the date/time function 124 of FIG. 1.

As time advances, a time for deletion can be calculated based on the time until deletion fields 208a-n and the last access fields 209a-n in comparison to today's date to determine if the time for deletion has been reached. For instance, the time for deletion associated with each user ID may be implemented as the respective sums of the time until deletion fields 208a-n and the last access fields 209a-n. Monitoring of time values and calculations can be performed as a background task independent of requests associated with the user IDs 202a-n.

In another embodiment, the time until deletion fields 208a-n can be implemented as counter values that are decremented towards zero as each day elapses. Upon one of the time until deletion fields 208a-n decrementing to zero, the time for deletion has been reached. In this embodiment, when an access occurs, an associated field in the last access fields 209a-n is set to the present date and an associated field in the time until deletion fields 208a-n is reset to a maximum value.

Alternatively, the security database 120 can replace last access fields 209a-n with deletion date fields, where the deletion date fields are updated upon a user ID access to today's date plus a corresponding value from the time until deletion fields 208a-n. The time until deletion fields 208a-n and the last access fields 209a-n are generally referred to as time stamp fields or time-based parameters, as they can be implemented in a variety of date/time formats and substituted with functionally equivalent variations to determine when the time for deletion has been reached.

The notification action fields 210a-n indicate desired actions upon detecting an access to or interaction with a user ID marked for deletion. For instance, field 210b indicates that admin1 should be notified by an e-mail message and associated information should be recorded in the system log 122, while field 210c indicates that an instant message should be sent to admin2 and logging performed. Notification action field 210n indicates that only logging should be performed. The logging-only option may be preferred when an administrator desires to periodically review groups of data without being notified by a message for every instance. As a further option, the notification action fields 210a-n can be omitted, and a standard notification action can be applied across multiple user IDs 202a-n.

FIG. 2 also illustrates that the passwords 204a-n can be reset to random data when a user ID is marked for deletion. For example, passwords 204a and 204d represent user-selected passwords, while passwords 204b, 204c, and 204n represent random data passwords. Automatic resetting of passwords for user IDs marked for deletion prevents people associated with the user ID from logging in, but keeps associated account information available for use. As a further example, when a person leaves a company, the company may need to keep the person's user ID active for a period of time to receive messages and allow time to identify which resources 112 associated with the user ID need to be reassigned or modified. Establishing a time for deletion provides a temporary window of access while ensuring that eventual deletion of the dormant user ID is not forgotten.

If one of the processes 110 of FIG. 1 requests access to a resource under authority of user2 202b, the resource manager 114 of FIG. 1 sends an authorization request to security manager 118 of FIG. 1, which acts as a triggering event for the security manager 118 to check the security database 120 of FIG. 1. Upon locating user2 202b in the security database 120, the security manager 118 can take additional actions as previously described. The resource manager 114 can send a notification to the security manager 118 as a triggering event, even if authorization is not required, such as when resources that are not covered by the security manager 118 are accessed.

Figure 3:
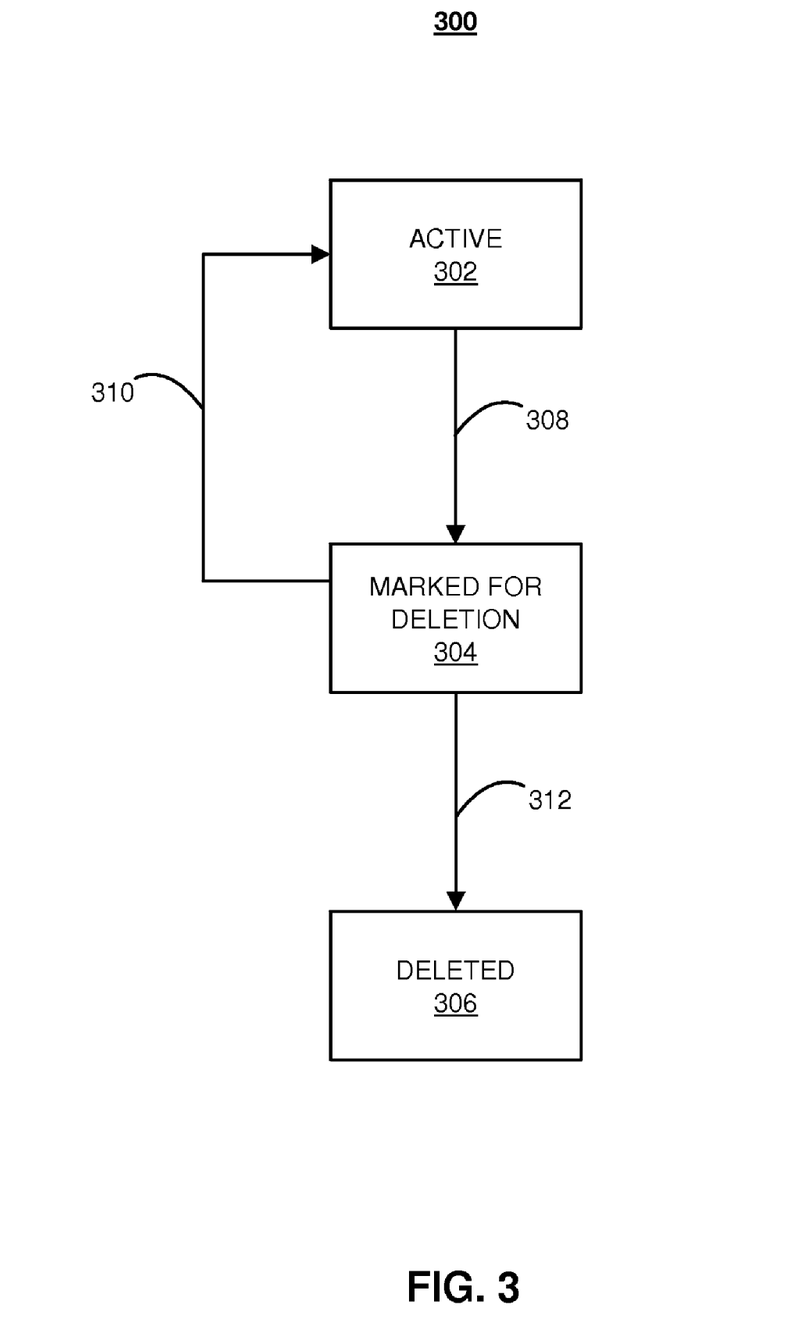
FIG. 3 depicts a state transition diagram for user identifier status in accordance with exemplary embodiments.

FIG. 3 depicts a state transition diagram 300 for a status associated with a user ID in accordance with exemplary embodiments. Status values of user IDs, such as status fields 206a-n of FIG. 2, can be in an active state 302, a marked for deletion state 304, or a deleted state 306. While in the active state 302, authorization checks of the user ID can be performed, data owned by the user ID may be retrieved, the user can log on with a password, and tasks can run using the user ID. The status value transitions from the active state 302 to the marked for deletion state 304 at transition 308. Transition 308 can be initiated by an administrative action when an administrator determines that the user ID should be deleted. If the administrator determines that the user ID should not be deleted, the administrator can initiate transition 310 to change the status value of the user ID from the marked for deletion state 304 to the active state 302. While in the marked for deletion state 304, authorization checks of the user ID can be performed, data owned by the user ID may be retrieved, the user may not log on with a password if the password has been changed, and tasks can run using the user ID. Upon detecting that the time for deletion has been reached without an access while in the marked for deletion state 304, transition 312 changes effectively status of the user ID from the marked for deletion state 304 to the deleted state 306. Upon transitioning to the deleted state 306, the user ID and associated data are removed, preventing any further actions using the user ID. The status value associated with the user ID need not be set to a value of "deleted"; rather, the deleted state 306 is achieved by the action of deleting the user ID and associated data. Additionally, it will be understood that the status value associated with the user ID can have other values beyond those depicted in the state transition diagram 300.

Figure 4:
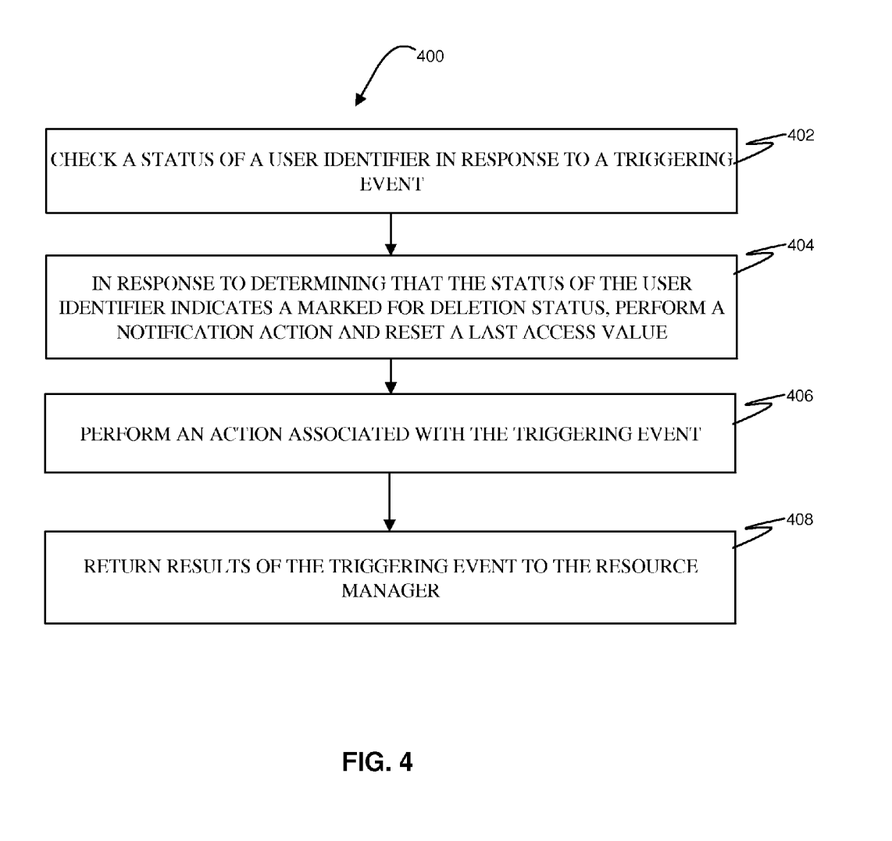
FIG. 4 depicts a first exemplary process for staged user identifier deletion in accordance with exemplary embodiments.

Turning now to FIG. 4, a first process 400 for staged user ID deletion will now be described in accordance with exemplary embodiments, and in reference to FIGS. 1-3. At block 402, the security manager 118 checks a status of a user ID in response to a triggering event. The check can be performed by examining user IDs 202a-n and status fields 206a-n of security database 120. The triggering event may be an authorization request from resource manager 114 in response to a request received by the resource manager 114 to access a resource of the resources 112 associated with the user ID requiring authorization. Alternatively, the triggering event may be a notification of a request associated with the user ID from resource manager 114 in response to a request received by the resource manager 114 to access a resource associated with the user ID absent an authorization.

At block 404, in response to determining that the status of the user ID indicates a marked for deletion status, the security manager 118 performs a notification action. The security manager 118 can reset one or more time stamp fields associated with the user ID in response to receiving the triggering event and determining that the status of the user ID indicates the marked for deletion state 304. The time stamp fields can include a last access field, a time until deletion field, and/or a deletion date field, in addition to other fields used to determine a time for deletion. The notification action may include logging information about the triggering event associated with the user ID with the marked for deletion status, and/or sending a message to a system administrator indicating an interaction with the user ID with the marked for deletion status. The security manager 118 uses information associated with the user ID from the security database 120, to complete the original request (in the case of an authorization request) and return the result (allow or deny) to the process referencing the user ID.

The status of the user ID can be set via an administrative action. In response to changing the status of the user ID from active to marked for deletion status, the security manager 118 may change a password associated with the user ID to random data, and reset one or more time stamp fields associated with the user ID to set the time for deletion. The changing of the password can either be done automatically as a result of resetting the status of the user ID to marked for deletion, or the administrator can do it manually at a later date if there is the need to access the user ID using the password for some time interval. The administrator may decide what to do about the password while setting the status.

At block 406, the security manager 118 performs the operation originally requested by the resource manager 114 and associated with the triggering event. If this is an authorization check, the check is performed and the result is returned to the resource manager 114 immediately. At block 408, the security manager 118 returns results of the triggering event to the resources manager 114.

Figure 5:
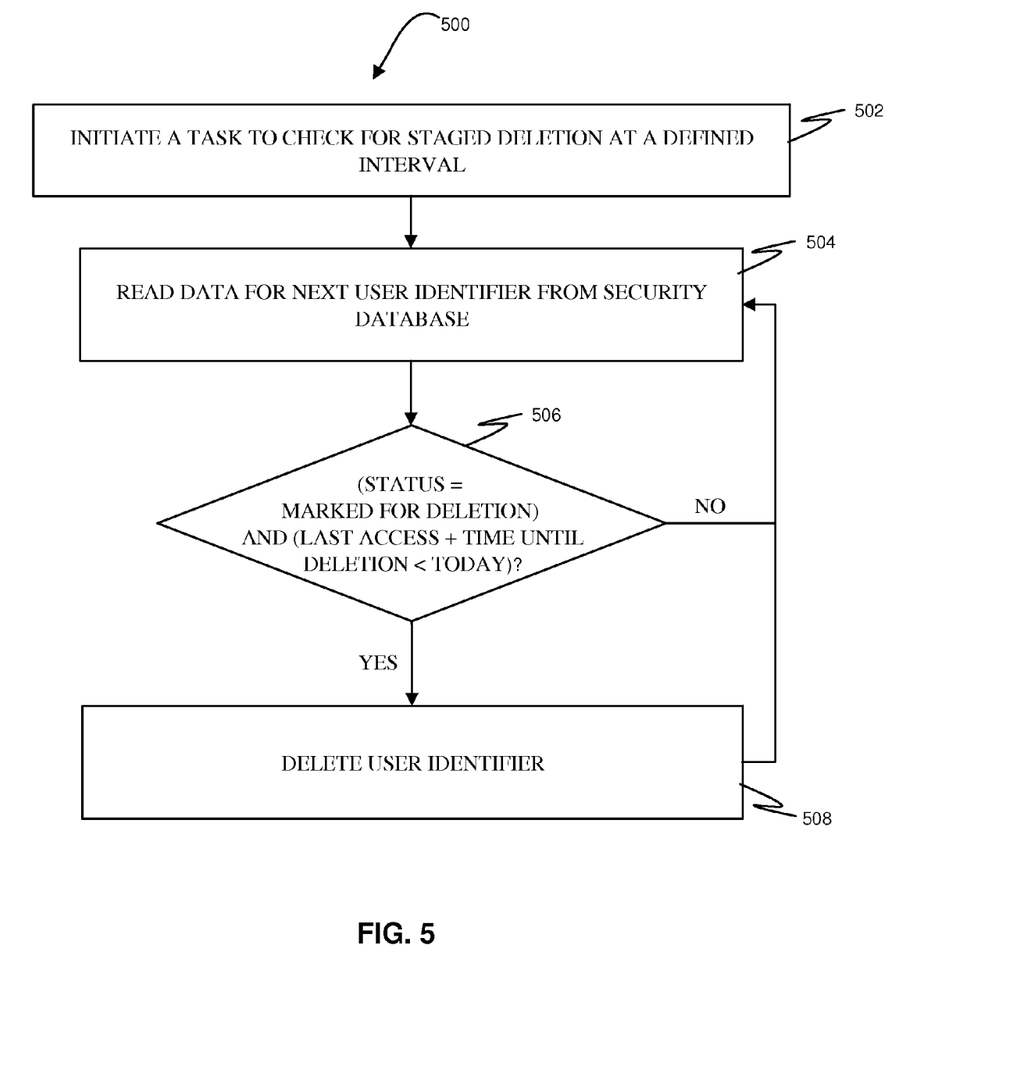
FIG. 5 depicts a second exemplary process for staged user identifier deletion in accordance with exemplary embodiments.

FIG. 5 depicts a second process 500 for staged user ID deletion that can be performed independent of process 400 of FIG. 4. The process 500 is also described in reference to FIGS. 1-3. At block 502, a task is initiated on host system 102 of FIG. 1 to check for staged deletion at a defined interval. The security manager 118 may control the process 500 to limit access to sensitive data in the security database 120. At block 504, data for a next user ID is read from the security database 120. At block 506, a check is performed to determine whether the status associated with the user ID is in the marked for deletion state 304 and a time-based check of the time for deletion is performed. The time-based check may compare whether the time of last access+time until deletion from fields 209 and 208 is earlier than today's date. If so then the user ID is deleted at block 508; otherwise, the flow returns to block 504 to continue stepping through the data for the user IDs in the security database 120. The process 500 ends when all user IDs have been analyzed. Thus at the time of deletion of a user ID, the system administrator does not need to perform any additional actions to completely delete the user ID from the security database 120. At any time prior to the deletion of the user ID marked for deletion, the status associated with the user ID can be changed back to the active state 302, preventing the user ID from being deleted. Optionally, a final notification action 210 may be sent in response to the deletion of the user ID.

The capabilities of the present invention can be implemented in software, firmware, hardware or some combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized to store instructions for execution of the security manager 118 and the resource manager 114 of FIG. 1. The computer readable medium may be a computer readable signal medium or a computer readable storage medium. A computer readable storage medium may be, for example, but not limited to, an electronic, magnetic, optical, electro-magnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:

1. A method for staged user identifier deletion, comprising:
checking a status of a user identifier in response to a triggering event;
in response to determining that the status of the user identifier indicates a marked for deletion status, performing a notification action indicating an access to the user identifier that is marked for deletion;
monitoring a time value to determine whether a time for deletion associated with the user identifier with the marked for deletion status has been reached;
resetting a last access field associated with the user identifier in response to receiving the triggering event and determining that the status of the user identifier indicates the marked for deletion status, the last access field indicating a date of a last access of the user identifier that is the marked for deletion;
updating the time for deletion to a value in the last access field plus a time until deletion to extend the time for deletion based on the triggering event; and
automatically deleting the user identifier with the marked for deletion status in response to determining that the time for deletion has been reached.

2. The method of claim 1 wherein the triggering event is an authorization request from a resource manager in response to a request received by the resource manager to access a resource associated with the user identifier requiring authorization.

3. The method of claim 1 wherein the triggering event is a notification of a request associated with the user identifier from a resource manager in response to a request received by the resource manager to access a resource associated with the user identifier absent an authorization requirement.

4. The method of claim 1 wherein the notification action comprises one or more of:
logging information about the triggering event associated with the user identifier with the marked for deletion status; and
sending a message to a system administrator indicating an interaction with the user identifier with the marked for deletion status.

5. The method of claim 1 further comprising:
setting the status of the user identifier via an administrative action; and
in response to changing the status of the user identifier from active to marked for deletion status, changing a password associated with the user identifier to random data, and resetting a time stamp field associated with the user identifier, wherein the time stamp field is one of: a last access field, a time until deletion field, and a deletion date field.

6. The method of claim 1 wherein checking the status of the user identifier is performed by a security manager accessing a security database, the security manager returning information associated with the user identifier from the security database and permitting a process referencing the user identifier with the marked for deletion status to proceed.

7. A system for staged user identifier deletion, comprising:
a security database comprising:
a plurality of user identifiers; and
status and time stamp fields associated with the plurality of user identifiers, the time stamp fields comprising last access fields and time until deletion fields; and
a security manager in communication with the security database and configured to perform:
checking a status of a user identifier from the plurality of user identifiers and status fields in response to a triggering event;
in response to determining that the status of the user identifier indicates a marked for deletion status, performing a notification action indicating an access to the user identifier that is marked for deletion;

monitoring a time value to determine whether a time for deletion associated with the user identifier with the marked for deletion status has been reached;

resetting a last access field associated with the user identifier in response to receiving the triggering event and determining that the status of the user identifier indicates the marked for deletion status, the last access field indicating a date of a last access of the user identifier that is the marked for deletion;

updating the time for deletion to a value in the last access field associated with the user identifier plus an associated value in the time until deletion fields to extend the time for deletion based on the triggering event; and automatically deleting the user identifier with the marked for deletion status from the security database in response to determining that the time for deletion has been reached.

8. The system of claim 7 wherein the system further comprises a resource manager to manage access requests to a plurality of resources; and the triggering event is an authorization request from the resource manager in response to a request received by the resource manager to access one or more resources of the plurality of resources associated with the user identifier requiring authorization.

9. The system of claim 7 wherein the system further comprises a resource manager to manage access requests to a plurality of resources; and the triggering event is a notification of a request associated with the user identifier from the resource manager in response to a request received by the resource manager to access one or more resources of the plurality of resources associated with the user identifier absent an authorization requirement.

10. The system of claim 7 wherein the notification action comprises one or more of:

recording information about the triggering event associated with the user identifier with the marked for deletion status in a system log; and sending a message to a system administrator indicating an interaction with the user identifier with the marked for deletion status.

11. The system of claim 7 wherein the security manager is further configured to perform:

setting the status of the user identifier via an administrative action; and in response to changing the status of the user identifier from active to marked for deletion status, changing a password associated with the user identifier to random data, and resetting one or more of the time stamp fields associated with the user identifier.

12. A computer program product for staged user identifier deletion, the computer program product comprising:

a non-transitory computer readable storage medium readable by a processing circuit and storing instructions for execution by the processing circuit for implementing a method, the method comprising:

checking a status of a user identifier in response to a triggering event;

in response to determining that the status of the user identifier indicates a marked for deletion status, performing a notification action indicating an access to the user identifier that is marked for deletion;

monitoring a time value to determine whether a time for deletion associated with the user identifier with the marked for deletion status has been reached;

resetting a last access field associated with the user identifier in response to receiving the triggering event and determining that the status of the user identifier indicates the marked for deletion status, the last access field indicating a date of a last access of the user identifier that is the marked for deletion;

updating the time for deletion to a value in the last access field plus a time until deletion to extend the time for deletion based on the triggering event; and automatically deleting the user identifier with the marked for deletion status in response to determining that the time for deletion has been reached.

13. The computer program product of claim 12 wherein the triggering event is an authorization request from a resource manager in response to a request received by the resource manager to access a resource associated with the user identifier requiring authorization.

14. The computer program product of claim 12 wherein the triggering event is a notification of a request associated with the user identifier from a resource manager in response to a request received by the resource manager to access a resource associated with the user identifier absent an authorization requirement.

15. The computer program product of claim 12 wherein the notification action comprises one or more of:

logging information about the triggering event with the user identifier with the marked for deletion status; and sending a message to a system administrator indicating an interaction with the user identifier with the marked for deletion status.

16. The computer program product of claim 12 wherein the method further comprises:

setting the status of the user identifier via an administrative action; and in response to changing the status of the user identifier from active to marked for deletion status, changing a password associated with the user identifier to random data, and resetting a time stamp field associated with the user identifier, wherein the time stamp field is one of: a last access field, a time until deletion field, and a deletion date field.

17. The computer program product of claim 12 wherein the method further comprises:

permitting a process referencing the user identifier with the marked for deletion status to proceed by returning information associated with the user identifier to the process referencing the user identifier.

\* \* \* \* \*